United States Patent [19]

McLennan

[11] Patent Number: 5,018,548
[45] Date of Patent: May 28, 1991

[54] SEGMENTED COUPLING FOR PIPES

[75] Inventor: William R. McLennan, Easton, Pa.

[73] Assignee: Victaulic Company of America, Easton, Pa.

[21] Appl. No.: 465,800

[22] Filed: Jan. 12, 1990

[51] Int. Cl.⁵ .................... F16K 1/226; F16K 51/00; F16L 17/00

[52] U.S. Cl. .................... 137/315; 251/148; 251/306; 251/367; 285/367; 285/373; 285/411; 285/419; 285/420

[58] Field of Search ............... 137/315; 251/148, 152, 251/367, 305, 306; 285/197, 198, 199, 112, 367, 373, 411, 419, 420

[56] References Cited

U.S. PATENT DOCUMENTS

| | | | |
|---|---|---|---|
| 2,086,001 | 7/1937 | Shaw | 251/367 |
| 2,227,551 | 1/1941 | Morris | 285/373 |
| 2,451,354 | 10/1948 | Ohls | 285/373 |
| 2,690,193 | 9/1954 | Smith | 285/373 |
| 2,869,221 | 1/1959 | Siepmann | 251/367 |
| 2,903,236 | 9/1959 | Holycross et al. | 251/331 |
| 3,129,920 | 4/1964 | Stillwagon | 251/306 |
| 3,132,881 | 5/1964 | Corey | 285/197 |
| 3,258,822 | 7/1966 | Schlesch et al. | 285/197 |
| 3,362,730 | 1/1968 | St. Clair et al. | 285/197 |
| 3,677,514 | 7/1972 | Mencarelli | 251/367 |
| 3,874,631 | 4/1975 | Osthues | 251/306 |
| 4,537,214 | 8/1985 | Cowan | 285/197 |
| 4,550,927 | 11/1985 | Resele | 285/419 |
| 4,611,839 | 9/1986 | Rung et al. | 285/367 |
| 4,639,020 | 1/1987 | Rung et al. | 285/367 |
| 4,896,902 | 1/1990 | Weston | 285/367 |

FOREIGN PATENT DOCUMENTS

0063857 11/1982 European Pat. Off. ............ 251/367

Primary Examiner—George L. Walton
Attorney, Agent, or Firm—Abelman Frayne Rezac & Schwab

[57] ABSTRACT

A segmented pipe coupling provides a housing for a butterfly valve, and preferably is provided with oppositely angled end faces of saw tooth configuration at the respective ends of the coupling segments, thus allowing the inclined end faces to emerge at the axial end faces of the coupling at or closely adjacent to the X,Z plane of an axially long coupling. A slow motion rotary drive for the butterfly valve also is provided.

7 Claims, 8 Drawing Sheets

SEGMENTED COUPLING FOR PIPES

FIELD OF THE INVENTION

This invention relates to a segmented pipe coupling assembled from coupling segments. Optionally, the coupling provides a "rigid" pipe coupling in the fully assembled condition of the coupling, or, a flexible pipe coupling.

A "rigid" pipe coupling is one in which the segments of the pipe coupling are capable of moving relative to each other during tightening down of a coupling assembled from such coupling segments, to permit keys of the segments to come into rigid clamping engagement with grooves formed in the ends of pipes or the like.

A "flexible" pipe coupling is one in which the end faces of the coupling segments engage each other prior to the coupling segments clamping down on the pipe exterior. This provides for limited movement of the pipe ends relative to each other.

Throughout the discussion of this invention, reference is made to pipes, it being understood that one or other of the pipes, or both, can be provided by a nipple, a flanged coupling, or any other fitting incorporating a nipple construction.

While not limited thereto, the invention finds particular utility in providing a segmented pipe coupling that incorporates a flow controller in the form of a butterfly valve, plug valve, ball valve or the like, as a sub-assembly insertable into the coupling segments prior to assembly of the pipe coupling.

BACKGROUND OF THE INVENTION

U.S. Pat. No. 4,611,839, issued Sept. 16, 1986, teaches a rigid pipe coupling in which the respective coupling segments each are provided with an end face at the respective opposite ends of the coupling segments, the respective end faces being oppositely inclined with respect to an X, Z plane of that coupling segment.

The provision of those oppositely inclined end faces permits rotation of the respective coupling segments about a Y—Y axis during tightening down of the coupling to bring keys of the respective coupling segments into clamping engagement either with side walls of a groove formed in the end of the associated pipe, or, the axial wall of that groove, or both, and in turn permits the internal circumferential length of a coupling assembled from those coupling segments to decrease during tightening down of the coupling.

The extent of rotational movement of the respective coupling segments is determined by engagement of the keys with the side walls of the pipe grooves, or, by the slope of the end faces in the X,Z plane, and, the extent to which the coupling segments move radially of the pipe axis before reaching clamping engagement with the pipe end.

This, in turn, can result in the X,Y plane of the respective coupling segments being oriented at an angle to the X,Y plane of the pipe, i.e., in a staggered and axially non-aligned orientation of the coupling segments as related to the longitudinal axis of the pipe.

While this poses no problems in conventional uses of such segmented pipe couplings, and in fact constitutes a substantial advantage of such segmented pipe couplings, it poses a particular problem in situations in which the respective coupling segments are required to remain with their respective X,Y planes within a determined angle of divergence from the X,Y plane of the pipe.

SUMMARY OF THE INVENTION

The present invention has for its object to provide a segmented pipe coupling in which the respective coupling segments retain their ability to rotate about the Y—Y axis of that coupling segment, but, to only a determined angular extent in order to provide either a rigid pipe coupling, or, a flexible pipe couling.

Having arrived at a segmented pipe coupling in which the coupling segments are limited in the extent of rotational movement about their associated Y—Y axis, a further object of this invention is to provide flow-controller that is insertable into the respective coupling segments at the time they are assembled into the segmented pipe coupling in order to provide an in-coupling flow-controller, which preferably is in the form of a butterfly valve, but which equally well could be in the form of a plug valve or ball valve, a butterfly valve being a hybrid form of a plug valve.

A segmented pipe coupling of the present invention is comprised of coupling segments each having an end face at the opposite ends thereof, the respective end faces of the coupling segments being oppositely inclined with respect to the X,Z plane of that coupling segment.

The respective end faces each are comprised of first and second end face portions each inclined in the same direction relative to the X,Z plane, and, a third end face portion extending between the adjacent edges of the first and second end face portions at an angle to said first and second end face portions to provide a saw tooth configuration of the respective end faces in the direction of the Z—Z axis but inclined relative thereto.

The third end face portion can extend in the X,Y plane of the coupling segment, but preferably is arranged at an acute positive angle relative thereto.

In this manner, a pair of coupling segments when assembled into a segmented coupling are capable of moving in opposite directions relative to each other during tightening down of the segmented pipe coupling about the Y—Y axis of the respective coupling segments.

Movement of the ends of the coupling segments and rotation of the coupling segments about their respective Y—Y axis will proceed under the influence of forces exerted during the tightening down of the coupling segment. Those forces will include a camming action between the respective juxtaposed end face portions as the respective coupling segments move towards each other in the radial direction of the pipe, and will include various other forces produced by traction bolts employed for securing the ends of the coupling segments to each other as produced during the tightening down of those traction bolts.

The extent to which the coupling segments can move about the Y—Y axis will depend on the accuracy of formation of the pipe groove itself.

Pipes vary in external diameter within a determined range of manufacturing tolerances, and, unless the pipe groove is lathe turned, the actual diameter of the axial wall of the pipe groove also will vary in dependence on those manufacturing tolerances. As the grooving of pipe ends commonly is performed in the field as opposed to a workshop, which renders lathe turning impractical, the common manner of grooving pipe ends is by the use of a grooving tool that employs the external surface of the pipe as the reference for the radial position of the axial wall of the pipe groove. Thus, due to the manner of formation of the groove, the radius of the axial wall of the groove will vary in direct relation to the manufacturing tolerances in the pipe itself.

This raises limitations on the extent to which the X,Y plane of the respective coupling segments can be brought into coincidence with the X,Y plane of the pipe. Coincidence can be obtained at only one diameter of pipe groove. However, unless the pipe groove is lathe turned, the diameter of the pipe groove cannot be guaranteed and will vary within the range of manufacturing tolerances. As the disparity between the minimum and the maximum range of manufacturing tolerances is quite small, in all instances, the coupling segments will be moved into very closely approximate coincidence of their respective X,Y planes upon tightening down of the coupling, the coincidence being so closely approximate that it is of little consequence in the finally assembled segmented pipe coupling.

It is a major object of the invention to ensure that any divergence of the X,Y plane of the coupling segments from the X,Y plane of the pipe is maintained within a determined range and that the Y—Y axis of the respective coupling segments remain in the X,Y plane of the pipe.

A particular application of the coupling segments of the present invention is for them to provide a housing for a flow-controller constituting a sub-assembly of the segmented pipe coupling.

According to a further feature of the present invention, at least the diametrically opposed coupling segments are provided with an aperture, that, in the assembled condition of the coupling is symmetrical about the Y—Y axis of the assembled coupling. The respective coupling segments are configured for them to receive and contain a sub-assembly including a flow-controller that can be rotated between an open and a closed position by means of an actuating shaft assembly extending through the aperture of one of the coupling segments, the shaft being journalled at its other end in a bearing assembly that is received in the aperture of the diametrically opposite coupling segment.

For all but the largest sizes of segmented pipe couplings, the pipe coupling will be comprised of two coupling segments that interfit to provide a complete coupling. For larger sizes of coupling, the coupling can comprise more than two coupling segments. In such a coupling comprised of multiple coupling segments, the coupling segments each can remain identical one with the other. However, in such a construction it is more practical to provide identical diametrically opposite coupling segments and intermediate coupling segments in which the apertures do not exist.

The flow-controller is in the form of a complete sub-assembly comprised of a body adapted to be received within and securely held by the coupling segments. The interior of the body can be configured in any manner compatible with its intended function. In the case of a butterfly valve, the body will be provided with a central aperture in which the butterfly valve is positioned and rotatable about the axis of the actuating shaft. The central aperture can be appropriately configured to accept either a plug valve or a ball valve, and, for it to provide the required seatings for those valves.

Conveniently, an actuating mechanism is provided for the valve, the actuating mechanism being connected to the valve sub-assembly exteriorly of the assembled coupling either prior to or subsequent to tightening down of the coupling. Also, conveniently, sealing members formed from an elastomeric material are provided internally of the assembled coupling, and which cooperate both with the coupling segments and with the contained valve flow-controller.

As will be appreciated, the addition of the flow-controller sub-assembly to the segmented coupling will result in an increase in the width of the coupling in the direction of the Z,Z axis.

In the absence of the saw tooth formation of the end faces of the coupling segments, this would limit the couplings of the present invention to large diameter couplings, for example, of 4 inches I.D. or more.

This is due to the fact that a planar surface passing through the X,Y,Z center of the coupling and which is inclined to the X,Z plane will emerge from the end faces of the coupling at a distance from the X,Z plane that progressively increases as the Z—Z length of the coupling is increased. However, as the arcuate extent of the coupling segments cannot exceed 180° if they are to pass onto a pipe, those portions of the coupling segments that extend beyond the pipe diameter must be formed as perpendiculars to the X,Z plane including the pipe axis.

On the other hand, the angle of the end faces relative to the X,Z plane is required to be larger than the critical angle of frictional repose, which usually is in the order of 20°. If a coupling of only one inch I.D. is to be provided, then, the coupling would then have to be considerably less than 1.75 inches in the Z—Z length, and, of approximately only 0.5 inch in the Z—Z length if the plane of separation of the coupling segments is to emerge at an acceptable position on the end faces of the coupling segments in which it is closely proximate to the X,Z plane.

An added advantage of the saw tooth formation of the end faces according to the present invention is that by "folding" those faces by providing dual end face portions and an intermediate portion inclined thereto, they can be caused to exit the coupling at any desired position on the end face of the coupling, including the diametral X,Z plane of the coupling.

Further, the saw tooth formation of the end faces of the present invention provides an additional advantage in correcting the orientation of the respective coupling segments as they are assembled onto a pipe.

Initially, the required seals are assembled onto the pipe. Then, one of the coupling segments and the flow-control sub-assembly is assembled onto the pipe. The other of the coupling segments is then assembled onto the pipe, this involving passing the said other coupling segment over the seals and over the flow-control sub-assembly.

If misalignment of the seals or of the flow-control sub-assembly has occurred, this will cause mis-orientation of the said other coupling segment acting to force the said other coupling segment out of the X,Y plane of the coupling. However, the intermediate third end face portions then act to move the said other coupling segment into its required orientation, and, in turn move the seals and the flow-control sub-assembly into correct orientation with respect to the X,Y plane of the coupling.

DESCRIPTION OF THE ACCOMPANYING DRAWINGS

The invention will now be described with reference to the accompanying drawings which illustrates preferred embodiments thereof, and in which:

FIG. 14 is a plan view of the control mechanism of FIG. 11 with a cover of that control removed; and, FIG. 15 is a plan view of the control mechanism of FIG. 11 with the cover in situ.

DESCRIPTION OF THE PREFERRED EMBODIMENTS

Figure 1:
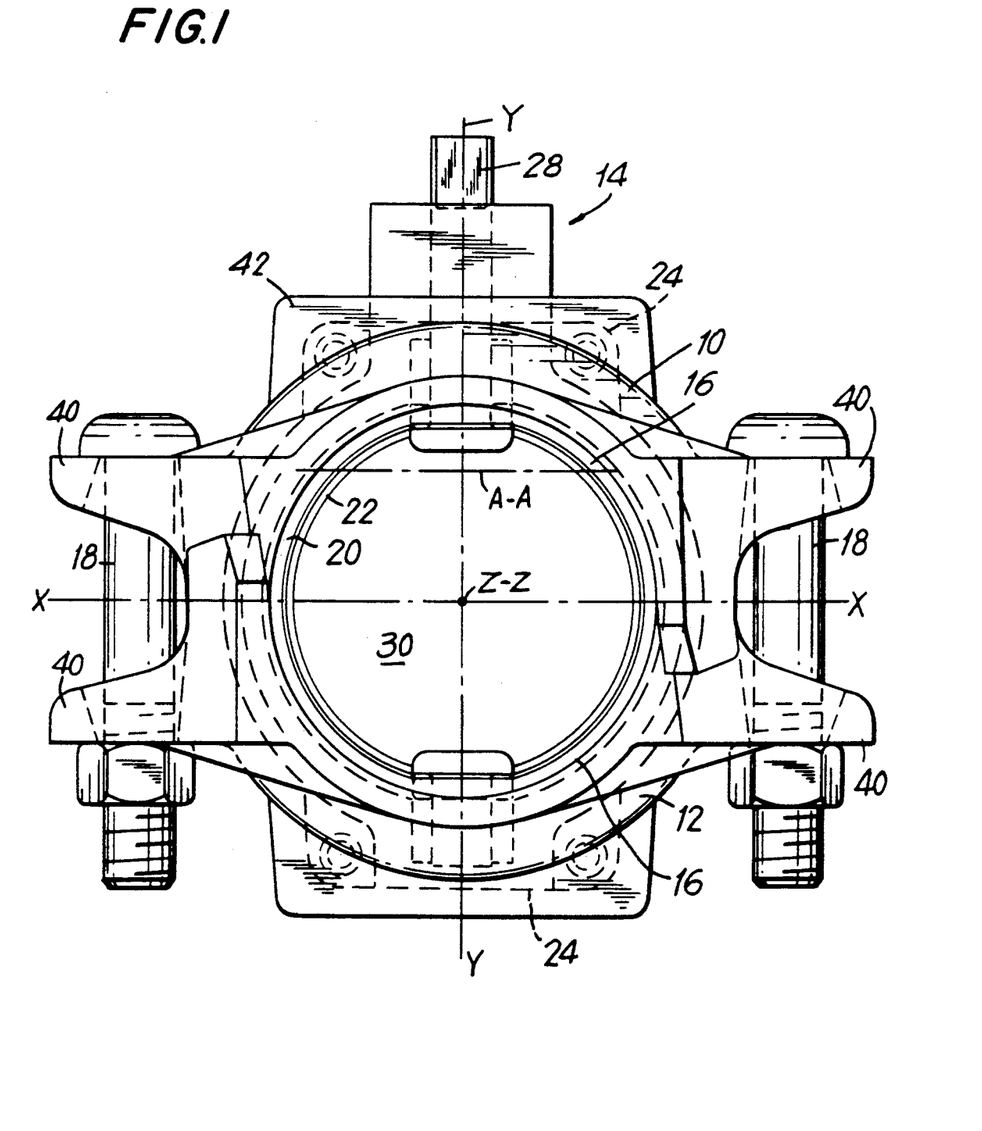
FIG. 1 is a front elevation of an assembled segmented pipe coupling with a flow-controller sub-assembly contained within the coupling.
Figure 2:
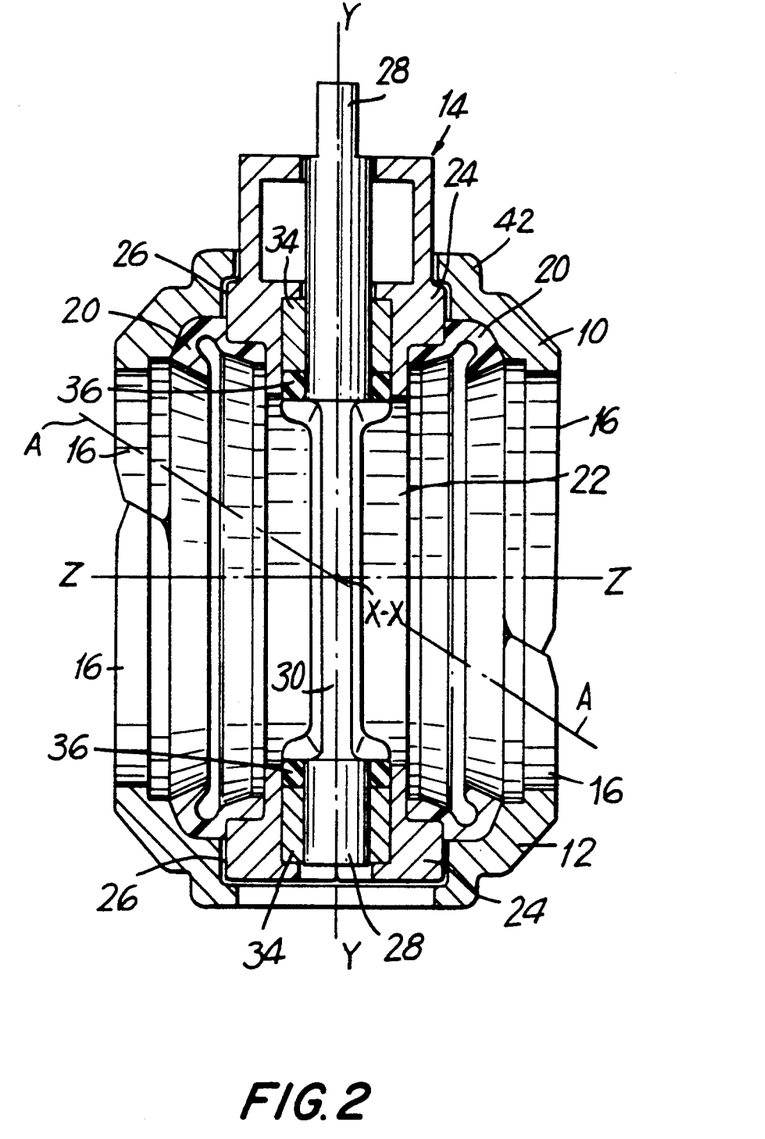
FIG. 2 is a transverse cross-section taken on the line 2—2 of FIG. 1.

Referring firstly to FIGS. 1 and 2, there is shown a complete segmented coupling for pipes in an assembled condition of the coupling, and, in the form it will be supplied for subsequent disassembly and assembly onto the grooved ends of the pipes (not shown).

The segmented coupling is comprised of an upper coupling segment 10, a lower coupling segment 12, and a flow controller sub-assembly in the form of a butterfly valve which is indicated generally at 14.

The respective coupling segments each are provided with keys 16 at their end faces for reception in grooves formed in the ends of pipes, the respective coupling segments being secured to each other by traction bolts 18 that are employed for tightening down the assembled coupling.

Located within the assembled coupling are sealing gaskets 20 formed from an elastomeric material, the sealing gaskets each having axially directed portions for sealing engagement, respectively, with the exterior surface of a pipe, and, with the contained flow-controller sub-assembly The flow-controller sub-assembly 14 in this embodiment is in the form of a butterfly valve, and, is comprised of a circular valve body 22 having bosses 24 extending diametrically thereof. The bosses 24 are to be received in socket openings 26 in the respective gasket segments 10 and 12, the respective bosses 22 providing a support for a rotatable spindle comprised of spindle portions 28 which are rigidly fixed to a butterfly valve 30. The butterfly valve is illustrated in a "closed" position, and is rotatable by the spindle 28 into an "open" position by rotating the butterfly valve about the Y—Y axis and towards or into coincidence with the Y,Z plane. Suitable bearings 32 and seals 34 are provided for the butterfly valves.

Figures 3, 4:
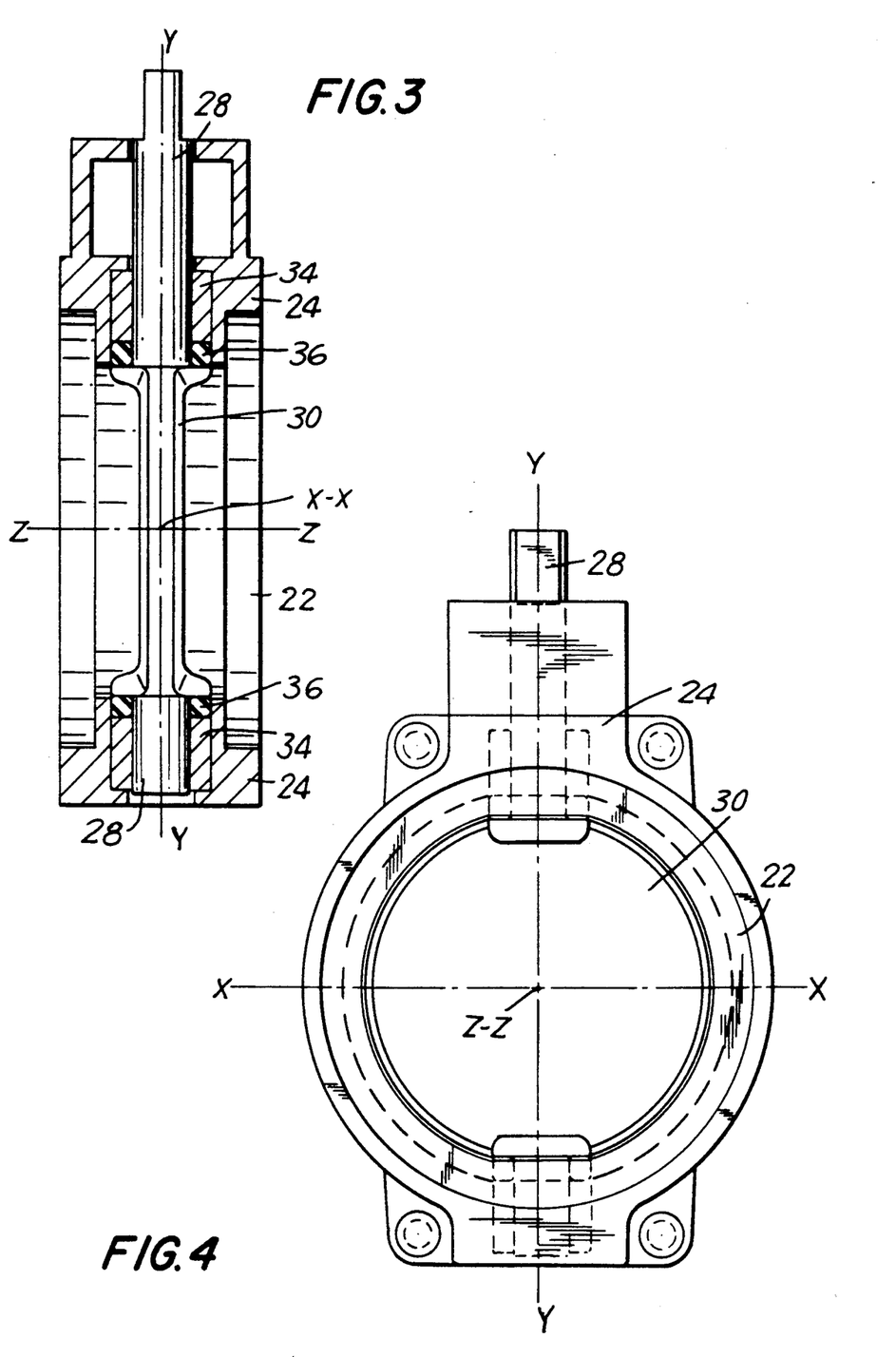
FIG. 3 is a transverse cross-section corresponding with FIG. 2 and showing the flow-controller sub-assembly alone.
FIG. 4 is a view corresponding with FIG. 1 and showing the flow-controller sub-assembly alone.
Figure 5:
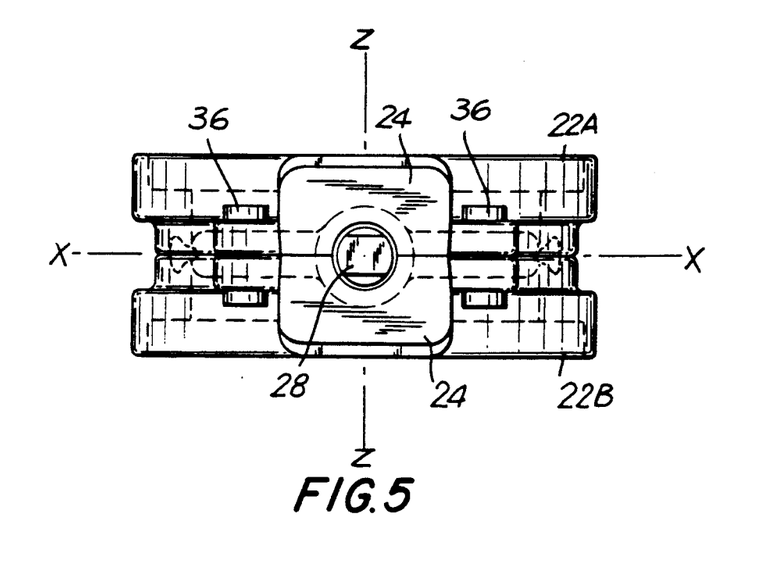
FIG. 5 is a plan view of FIG. 4.
Figure 6:
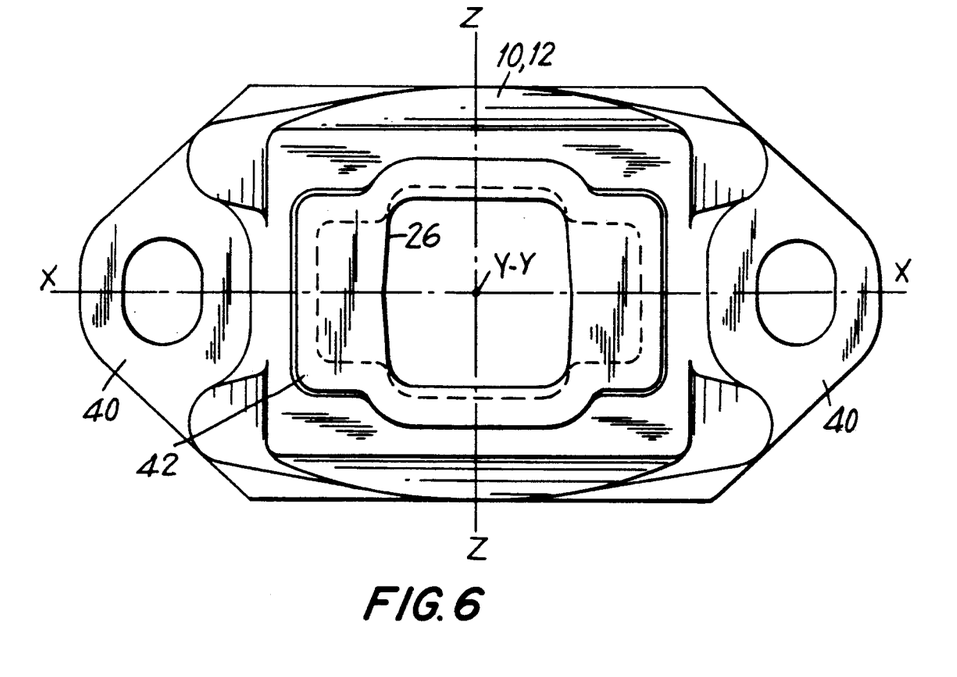
FIG. 6 is a plan view of one of the gasket segments of FIG. 1.
Figure 7:
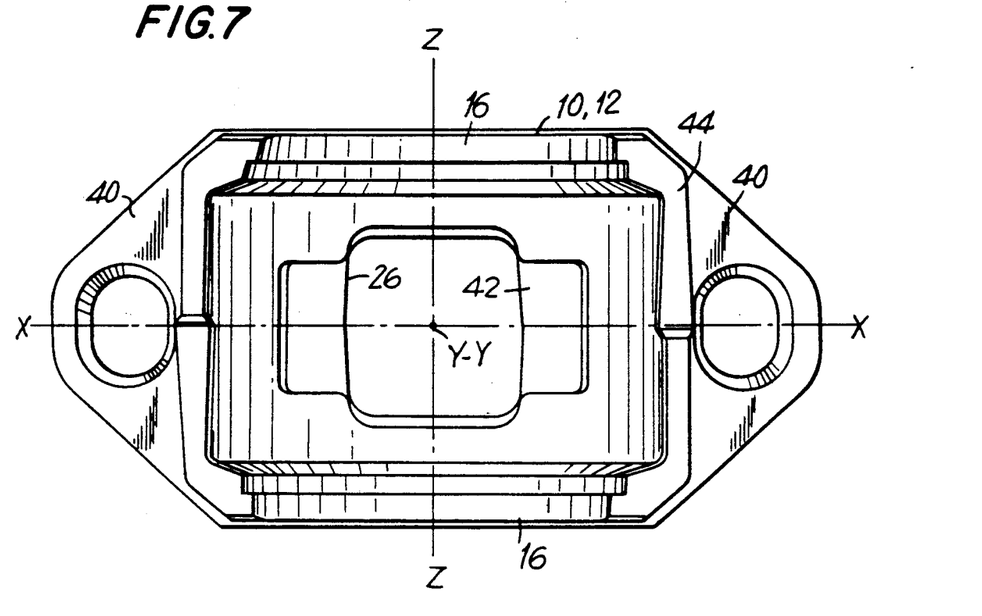
FIG. 7 is an underside plan view of the gasket segment of FIG. 7.

The butterfly valve providing the flow-control sub-assembly 14 is shown separate from the coupling segments 10 and 12 in FIGS. 3-5.

As a matter of convenience, the cylindrical valve body 22 is formed by casting or forging as two body portions 22A, 22B, which are assembled to each other on opposite sides of the butterfly valve 30, which itself is provided as a casting or forging integral with the spindle portions 28. The body portions 22A, 22B of the cylindrical valve body 22 are then rigidly secured to each other by rivets 36, the required bearings 32 and seals 34 having been pre-assembled onto the spindle portions 28.

In this manner, a compact and relatively inexpensive butterfly valve construction is provided which readily can be removed from the coupling and replaced should servicing be necessary.

As will be readily apparent, instead of providing a butterfly valve, the flow-control sub-assembly can provide different types of valves, such as a plug valve, or a ball valve by employing the same manner of construction.

Without regard to the manner of configuration of the sealing surfaces of the flow-controller sub-assembly, a standard configuration of the outer surfaces of the flow-control sub-assembly can be provided. In this manner, interchangeability of any desired form of valve and the replacement of such valves can be accomplished using standard coupling segments that are identical in all respects one with the other.

The formation of the coupling from identical coupling segments greatly reduces the manufacturing and warehousing costs, and also, eliminates the possibility of dissimilar coupling segments being incorrectly assembled one to the other.

Referring now to FIGS. 6-10, a preferred configuration of the respective coupling segments 10, 12 is discussed, as is the manner of cooperation of those coupling segments one with the other to provide the benefits of the present invention.

Figure 9:
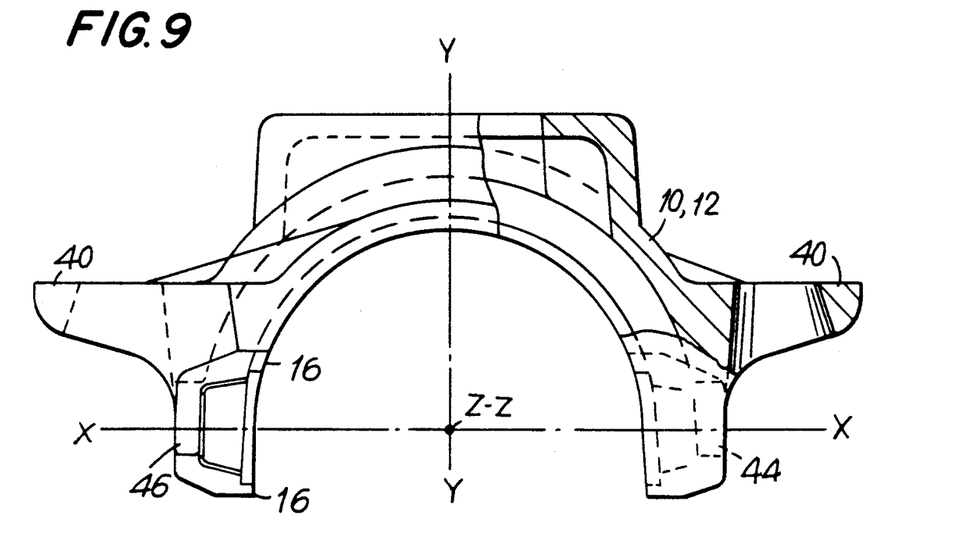
FIG. 9 is a front elevation, partially in section, of the gasket section of FIG. 6.

As will be more clearly apparent from FIG. 9, the coupling segments 10 and 12 each have a semi-circular inner periphery adapting that coupling segment to be passed over the end of a pipe in a direction radially of the pipe axis. The respective coupling segments have bolting pads 40 having bolting faces for cooperation with either the head or the nut of a traction bolt 18, the bolting faces extending in a plane parallel to the X,Z plane of the coupling segment. Centrally of the coupling segment and arranged symmetrically around the Y—Y axis is a housing 42, which has internal surfaces configured to contain and locate a boss 24 of the flow-controller sub-assembly 14, the housing 42 providing the socket opening previously discussed.

The respective opposite ends 44, 46 of the coupling segment are of identical configuration one with the other, but, reversed through 180° as viewed along the X—X axis. In this manner, any one end of any corresponding coupling segment will interfit with either end of an identical coupling segment.

Figure 8:
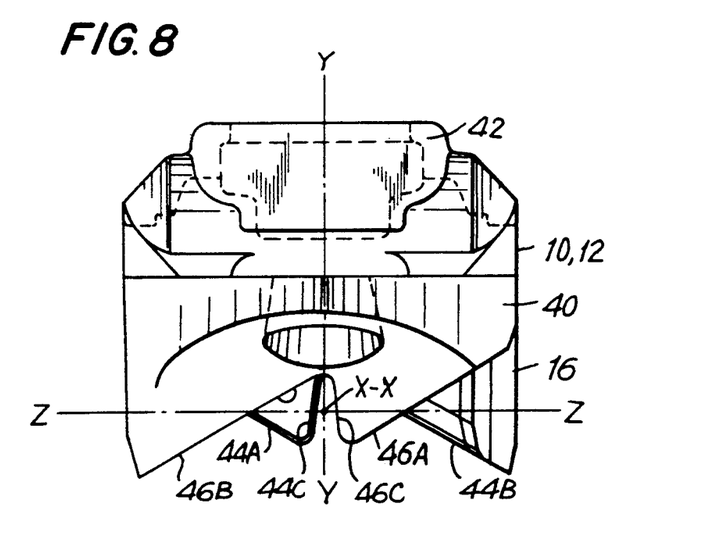
FIG. 8 is an end elevation of the gasket segment of FIG. 6.

The respective end faces each are inclined with respect to the X,Z plane of the coupling segment, but, in opposite directions relative to the X,Y plane as illustrated in FIG. 8.

Thus, upon rotation of the coupling segment about the Y—Y axis through 180°, and end view of the coupling segment will be identical in all respects with that shown in FIG. 8, and, the coupling segment will interfit with an identical coupling segment without regard to which of the end faces 44 and 46 of one of the coupling segments is presented to an end face 44 or an end face 46 of the other coupling segment.

As will be observed from FIG. 8, if the coupling segment is rotated 180° about the Y—Y axis, then, the end face 46 becomes the end face 44, and vice versa.

In a preferred embodiment of the invention, and for purposes that will be discussed later with respect to FIG. 10, the respective end faces each include two end face portions 44A and 44B, or, 46A and 46B. As is discussed later with respect to FIG. 11, more than two end face portions can be provided. As shown in FIG. 8, the end face portions 44A and 44B extend in planes parallel to each other, and similarly, the end face portions 46A and 46B extend in planes parallel to each other but reversed in direction with respect to the X,Z plane of the coupling segment. If the coupling segments are to be symmetrical and identical in all respects, this relationship has to be preserved. The respective end face portions 44A, 44B and 46A, 46B are interconnected at their adjacent ends by a further end face portion 44C or 46C, thus providing a saw-tooth formation of the end faces as viewed along the X—X axis.

The intermediate end face portions 44C and 46C must be positioned either coincident with the X,Y plane, or, as is preferable, displaced to opposite sides of the X,Y plane. This arrangement of the intermediate end face portions must be duplicated in reverse at the opposite end of the coupling segment, for otherwise the coupling segment will become asymmetrical. The intermediate end face portions 44C and 46C can extend parallel to the X,Y plane, but preferably are arranged at an angle to that plane converging towards that plane in the direction of the Y+ axis.

The respective end faces 44A, 44B and 46A, 46B must be linear in the direction of the Z—Z axis. They do not necessarily need to be linear in the direction of the X—X axis but preferably are so. Similar considerations apply to the intermediate end face portions 44C and 46C as related to the X,Y plane of the coupling segment.

Figure 10:
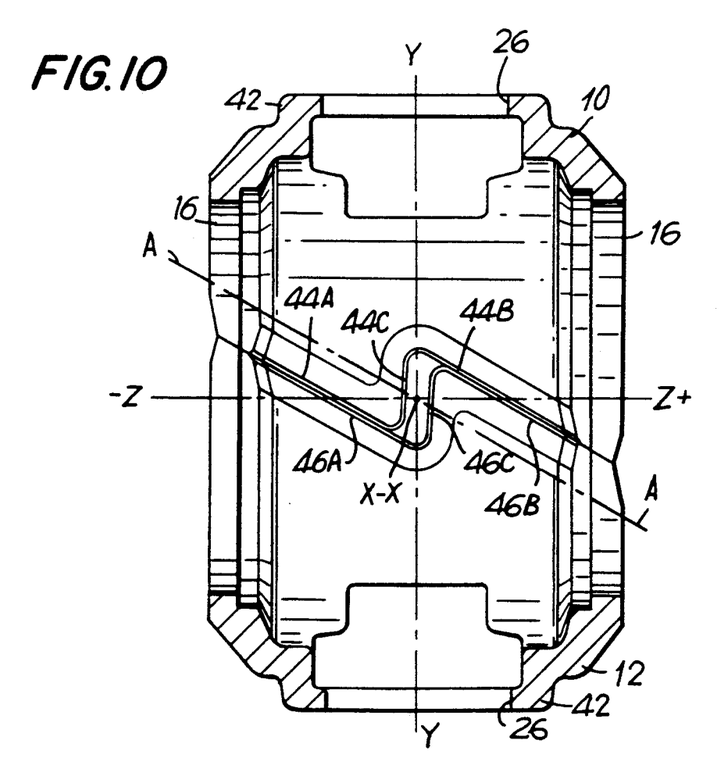
FIG. 10 is a cross-sectional view corresponding with FIG. 2 showing the gasket segments in assembled condition, and, with the flow-controller sub-assembly removed.

Referring now to FIG. 10, this Figure shows the ends of two coupling segments when arranged in interfitted relation, this interfitted relation having been produced by rotating the coupling segment 10 180° about the Z—Z axis for it then to become the coupling segment 12. In this interfitted relation of the end face portions, the end face portions 44A and 46A have become juxtaposed, and, the end face portions 44B and 46B have become juxtaposed, and, the intermediate end face portions 44C and 46C have become positioned in spaced parallel relation.

In this relationship, the end face portions 44A, 44B and 46A, 46B restrain the coupling segment 10 from movement in the Z— direction, and also restrain the coupling segment 12 from movement in the Z+ direction, any such movements producing interengagement of the respective end face portions 44A, 46A and 44B, 46B. Further, the coupling segments 10 and 12 can only move in the opposite direction by the distance B existing between the intermediate end face portions 44C and 46C. Thus, the coupling segments when assembled to each other are limited in the extent of their permitted movement about the Y—Y axis. Further, the interengagement of the respective end face portions 44A, 46A and 44B, 46B will act to orient the respective coupling segments in parallelism with, but not necessarily coincidence with the Y—Y axis of the pipe, i.e., lateral tilting of the respective coupling segments with respect to each other is eliminated.

Upon tightening down of the traction bolts, the respective coupling segments are drawn towards each other into approximate coincidence with the X,Y plane, and, over-swinging of the respective ends of the coupling segments about the Y—Y axis is prevented. Such over-swinging of the ends of the respective coupling segments is to be avoided in that it can cause scuffing, distortion and dislocation of the seals 34 contained within the respective coupling segments, with consequential leakage at those seals in the finally assembled condition of the coupling. The more the respective coupling segments are drawn towards each other, the greater will be the compressive stresses exerted on the contained gaskets, which are then highly susceptible to scuffing, distortion and dislocation in the event that over-swinging of the ends of the coupling segments should occur.

Over-swinging of the ends of the coupling segments is prevented by interengagement of the intermediate end face portions 44C and 46C, which determine the maximum extent of swinging movement. Provided that the intermediate end face portions 44C and 46C are spaced sufficiently from each other, then, the coupling of the present invention can accommodate all deviations within the range of manufacturing tolerances in the pipe and the consequential variations in the dimensions of the grooves.

A most important advantage arising from the saw tooth arrangement of the end faces will now be discussed with respect to FIGS. 10 and 11.

Due to the incorporation into the coupling of the flow-controller sub-assembly 14, the coupling is very substantially increased in its axial length in the direction of the Z—Z axis. If, now, the end faces of the coupling segments were to be provided as a single face extending through the X,Y,Z center, as indicated by the chain dotted line A—A in FIG. 10, then, the plane of the end faces would emerge from the coupling at the opposite ends thereof at a position spaced so distant from the X,Z plane as to make proper sealing of the coupling impossible, and which also would seriously weaken the joint provided by the coupling.

This is because the respective coupling segments must be capable of being fitted onto a pipe, which in turn precludes an arcuate extent of the coupling segments of more than 180° about the Z—Z axis. Any portion of the coupling segment extending to the opposite side of the X,Z plane of necessity must extend perpendicular to the X,Z plane and tangentially to the radius of the pipe. This will result in an arcuate sector of the pipe being unsupported between the X,Z plane and the point of emergence of the A—A plane at the end faces of the coupling.

This problem is significantly reduced, and can be eliminated in its entirety by employing the saw tooth formation of the end faces as taught by the present invention, which makes it possible to provide a coupling that is considerably longer along the Z—Z axis than it is in radius about the Z—Z axis. Thus, by appropriate arrangement of the end face portions, and, the employment of multiple end face portion as illustrated in FIG. 11, the end faces of the respective coupling segments can be arranged to emerge from the side faces of the coupling at any desired position, including on the X,Z plane of the coupling as illustrated in FIG. 11.

All that is required is to establish the angle of inclination of the end face, i.e., the angle of the X,A plane relative to the X,Z plane, and then, to organize the respective end face portions for them to intersect the X,Z plane and extend to opposite sides of the X,Z plane.

Figures 11, 12:
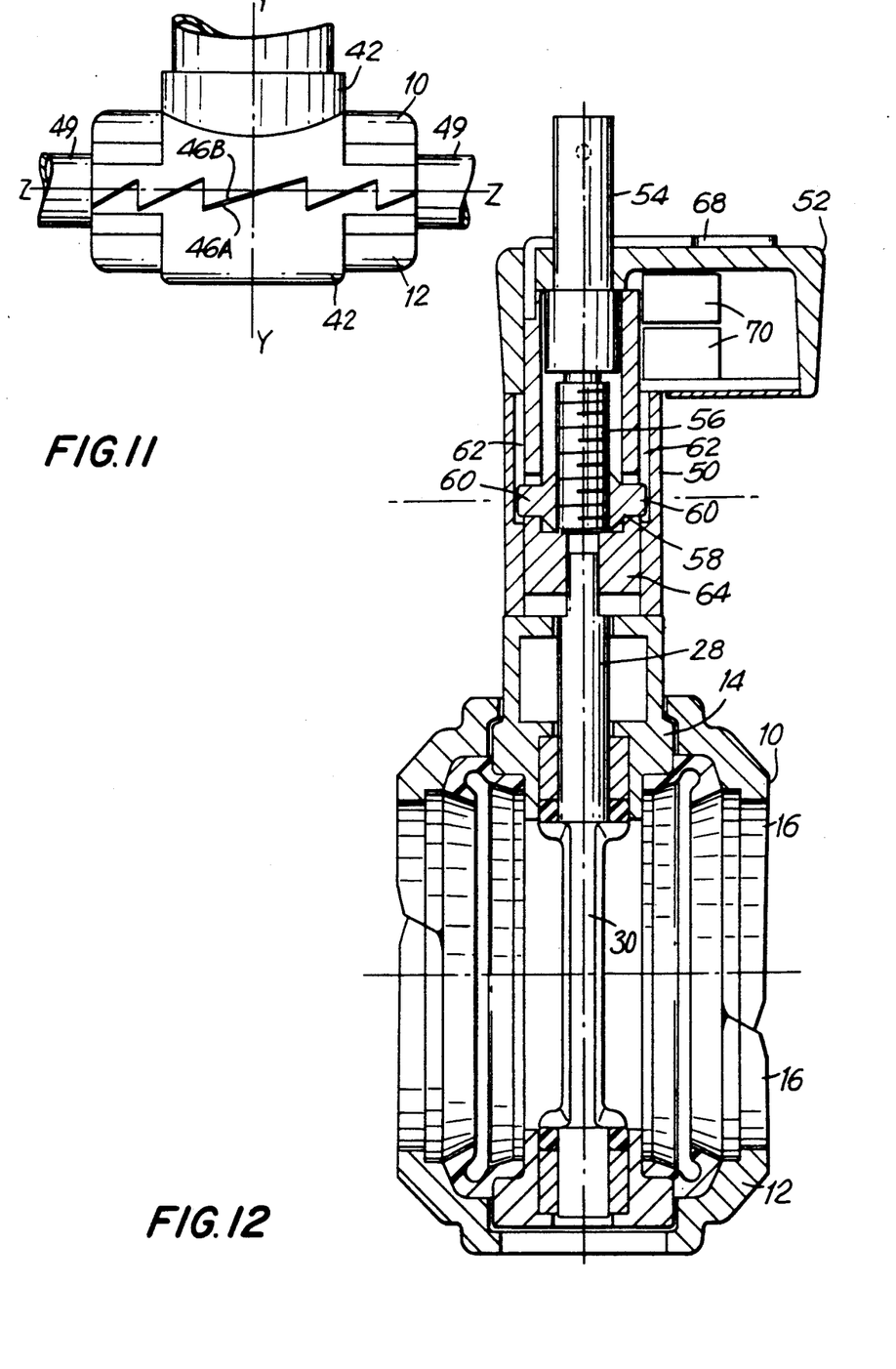
FIG. 11 is a diagrammatic front elevation of an axially long segmented coupling providing a T-connector.
FIG. 12 is a view corresponding with FIG. 2, but showing a control mechanism attached to the flow-control sub-assembly.

As is illustrated in FIG. 11, the coupling segments of the present invention can provide a coupling of a form different to that previously discussed with respect to FIGS. 1–10. For example, and as shown, the coupling segments of the present invention can provide a branch coupling between a pipe 48 of relatively large diameter and pipes 49 of a relatively small diameter. Similarly, the coupling of FIG. 10 can be provided as a T-connecter or an X-connector.

Referring now to FIGS. 12–15, an actuator for the flow-controller is illustrated. That actuator includes a housing 50 provided with a cover 52. The housing 50 is secured to the boss 24 of the flow-controller sub-assembly in any convenient manner in encircling relation with the spindle 28.

The actuator includes a shaft 54, that can be rotated by a hand wheel, electric motor or any other convenient means, the shaft 54 having a threaded stem 56 which extends through the threaded bore of a travelling nut 58. The travelling nut 58 has oppositely extending bails or trunnions 60 that respectively extend into axially straight grooves 62 formed within the housing 50. Thus, on rotation of the spindle 54, the nut 58 will be caused to travel upwardly or downwardly within the axially straight grooves 62, depending on the direction of rotation of the shaft 54, in the absence of rotation of the nut.

Figure 13:
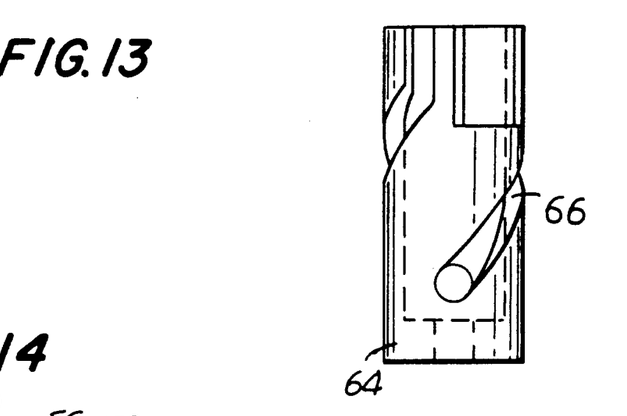
FIG. 13 is a front elevation of a scroll cam incorporated into the control mechanism of FIG. 11.

Surrounding the nut 58 and rotatably supported within the housing 50 is a sleeve 64, the sleeve 64 having circumferentially extending slots providing scroll cams 66, as illustrated in FIG. 13. Thus, upon axial movement of the nut 58, the bales or trunnions will travel upwardly within the scroll cam slots 66, and in so doing, will cause the sleeve 64 to rotate.

In this manner, a slow-motion drive is provided to the sleeve 64 requiring multiple turns of the spindle 54 to produce a 90° rotation of the sleeve 64.

Figures 14, 15:
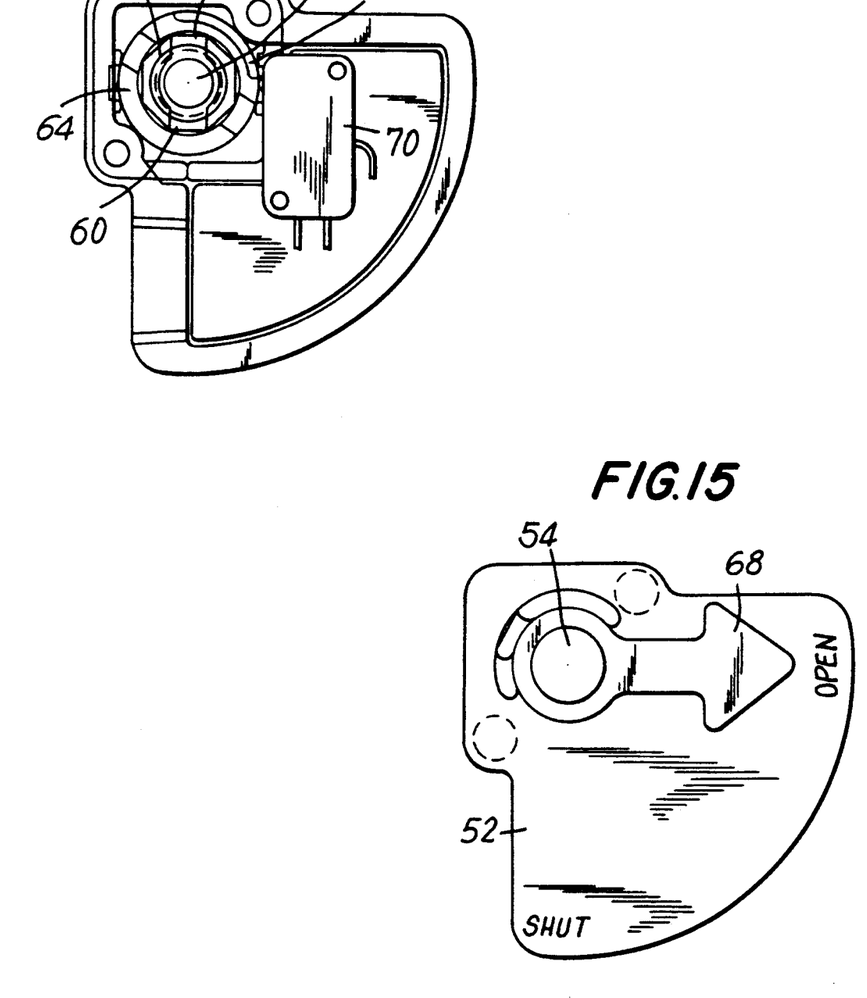

As shown in FIGS. 12 and 15, an indicator in the form of a pointer 68 is rigidly secured to the sleeve 64 and is journalled for rotation about the shaft 54. Thus, as the sleeve 64 slowly rotates, so will the indicator 68 slowly displaced between open and shut indications provided on the cover 52.

As illustrated in FIG. 14, this rotation of the sleeve 64 also can be utilized to actuate microswitches 70 contained within the cover 52, the microswitches being operated by cam surfaces 72 on the sleeve 64. In this manner, an electrical signal can be provided to an indicator indicating the open or closed position of the butterfly valve 30.

It will be understood that the various modifications may be made in the preferred embodiments without departing from the scope of the appended claims.

What is claimed is:

1. A coupling segment for assembly into a segmented coupling for pipes, said coupling segments having an end face at the respective opposite ends thereof which extends in the direction of the axis Z of the coupling and transverse to an X,Y plane thereof, said end faces being inclined in opposite directions with respect to an X,Z plane of the coupling segment and being operative to produce rotation of the associate coupling segment about the Y—Y axis thereof upon tightening down of said segmented coupling, each said end face being comprised of end face portions (44A, 44B or 46A, 46B) arranged in parallelism with each other, and, an intermediate end face portion (44C or 46C) extending between the adjacent ends of said end face portions and extending at an angle thereto in a direction extending transverse to and spaced to one side of said X,Y plane to permit said rotational movement of said segment coupling about said Y—Y axis, whereby said respective end faces emerge on opposite axial ends of a coupling assembled from such coupling segments at a position closely adjacent to an X,Z plane of said coupling.

2. The coupling segment of claim 1, in which said end face portions are each linear in the direction of the Z—Z axis.

3. The coupling segment of claim 2, in which said intermediate end face portion is linear in the direction of the Y—Y axis.

4. The coupling segment of claim 3, in which said intermediate end face portion is inclined relative to the X,Y plane of said coupling segment, and is spaced to one side of the X,Y plane of said coupling segment.

5. The coupling segment of claim 1, in which said end faces are of saw tooth configuration when viewed in the direction of the X—X axis of the coupling segment.

6. A segmented coupling for pipes assembled from the coupling segments of claim 1.

7. The segmented coupling for pipes of claim 6, including a flow-controller sub-assembly contained within the assembled coupling segments, and further including seal members interposed between axially oppositely sides of said flow-controller sub-assembly and the associated coupling segments.

* * * * *